Patented Nov. 29, 1949

2,489,927

UNITED STATES PATENT OFFICE 2,489,927

PREPARATION OF INTERMEDIATES FOR SYNTHESIS OF AMINO ACIDS

Karl Pfister, III, Summit, and Max Tishler, Rahway, N. J., assignors to Merck & Co., Inc., Rahway, N. J., a corporation of New Jersey No Drawing. Application April 16, 1946, Serial No. 662,621

3 Claims. (Cl. 260—465.4)

This invention is concerned generally with novel processes for preparing intermediates useful in the synthesis of amino acids; more particularly, it relates to an improved method for the manufacture of acylamido derivatives of compounds containing an active methylene group.

Compounds of this class can be represented by the following general formula:

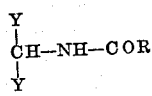

wherein R is alkyl and Y is an activating radical such as a carboxylic ester, cyano, acyl, or nitro radical. Specific compounds within this generic class can be converted to amino acids such as phenyl alanine, leucine, valine, methionine, threonine and the like by processes such as those described in J. A. C. S. 67, 36, 38 and 502 (1945).

It is known that α-acylamido acetic ester compounds can be prepared by reductive acylation of the corresponding α-oximino derivative as described in co-pending application, Serial No. 646,701, filed February 9, 1946; by aluminum reduction of the oxime acetates (Compt. Rendue 194, 1954 (1932)); and by acetylation of the amines obtained by reduction of the oximino compounds (Snyder et al., J. A. C. S. 66, 350 (1944)). All of these methods, however, suffer from the disadvantage that it is difficult to obtain the intermediate α-oximino compounds. These oximino derivatives, which are best prepared in glacial acetic acid solution, are low-melting compounds or oils which are slow to crystallize and consequently difficult to isolate and purify. They decompose readily and may even explode so that their large scale preparation is inconvenient and in some cases hazardous. In view of these disadvantages, it is difficult to obtain a good overall yield of α-acylamido acetic ester compound from the corresponding acetic ester via the oximino intermediate; for example, in the Snyder et al. art, above cited, the yield of diethyl α-acetamido-malonate from the starting material, diethyl malonate, is reported to be about 40% of theory.

The present invention is concerned with an improved process generally applicable for the synthesis of acylamido derivatives of compounds containing an active methylene group, whereby α-acylamido acetic ester compounds are obtainable from the corresponding acetic ester in yields of over 90% of theory. According to this alternative process, a compound having the formula: Y—CH₂—Y, wherein the —CH₂— is an active methylene group, and Y is an activating radical such as a carboxylic ester, cyano, acyl, or nitro substituent, is reacted with an aryl diazonium salt in the presence of an aqueous alkaline solution to produce an aryl azo or aryl hydrazino derivative which can be represented respectively by the formulae: $(Y)_2CH-N=NR'$ and

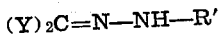

$$(Y)_2C=N-NH-R'$$

wherein R' is aryl and Y has the significance above defined. In some cases these two isomers can be separated; in others it appears that a tautomeric equilibrium exists between the two forms. This intermediate is stable and readily crystallizable and a substantially quantitative yield of pure material can be obtained. This aryl hydrazino or aryl azo intermediate is then reacted with a metal reducing agent in the presence of an acylating agent whereby the azo linkage is simultaneously reduced to amino and acylated to produce a mixture comprising the corresponding N-acylated arylamine and the desired acylamido compound of the formula

$$(Y)_2CHNHCOR$$

wherein R is an alkyl radical and Y has the significance above defined. For example, if the starting material employed is ethyl β-keto-butyrate, and this is reacted with benzene diazonium chloride, the intermediate product consists of ethyl α-(phenyl-hydrazino)-β-keto-butyrate and the ethyl α-(phenyl-azo)-β-keto-butyrate, which upon reduction as above described, employing zinc dust and acetic anhydride, yields a mixture of acetanilide and ethyl α-acetamido-β-keto-butyrate. This process can be represented by the reactions indicated generally as follows:

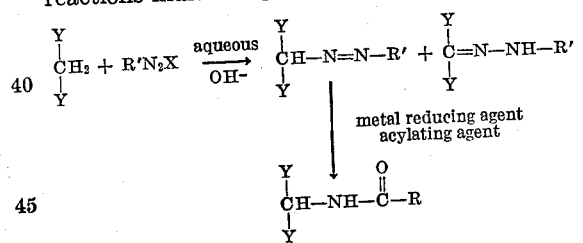

wherein R is an alkyl group, R' is aryl, X is an anion of an inorganic acid, and Y is an activating radical such as a carboxylic ester, cyano or acyl radical.

The aryl diazonium salt solution, prepared in the usual manner, is added to a cold aqueous alkaline solution of the compound represented by the formula Y—CH₂—Y, wherein —CH₂— is an active methylene group and Y is an activating radical. Compounds of this class which can be used as starting materials include, ethyl β-keto-butyrate, methyl β-keto-butyrate, benzyl β-keto-valerate, ethyl β-keto-butyronitrile, benzyl β-keto-capronitrile, malonodinitrile, diethyl malonate, dimethyl malonate, diphenylmalonate, ethyl α-cyano-acetate, butyl α-cyano-acetate, tolyl α-cyano acetate, acetyl acetone, 3:5-diketo-octane, and the like. The aqueous solution is made alkaline with an alkali or alkaline earth metal hydroxide, carbonate or acetate, such as sodium hydroxide, potassium carbonate, barium acetate and the like; it is presently preferred to use a mixture of an alkali hydroxide, and an alkali acetate. In order to complete the reaction and formation of the azo or hydrazino intermediate compound, the mixture is allowed to stir for considerable time following the addition of the diazonium salt solution; 3 to 4 hours is generally sufficient to complete reaction and crystallization of the product. The product is best dried at about 35° C. either by means of air or under vacuum.

This product is converted to the desired acyl-amido derivative by reduction with a metal reducing agent in conjunction with an acylating agent. This process is suitable not only for reductive acylation of the above compounds of formulae: $(Y)_2CH-N=N-R'$ and

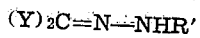
$(Y)_2C=N-NHR'$ wherein Y and R' have the significance above defined, but is also generally applicable to the preparation of acylamido derivatives from azo compounds and hydrazones such as azobenzene, acetone phenyl-hydrazone, cyclohexanone tolyl hydrazone, and the like. The metal reducing agent can be any metal capable of yielding hydrogen with organic acids, as for example, zinc, iron, magnesium, aluminum, and the like. The metal is best employed in finely divided form and in the present invention, it is preferred to use zinc dust. The reaction should be carried out at a temperature of approximately 0° C. to about 60° C.; it has been found best to add the azo compound portion-wise to the mixture and to warm to about room temperature for completing the reaction. The acylating agent which is used in conjunction with the metallic reducing agent can be any aliphatic organic acid anhydride and this is used in conjunction with an organic acid which provides hydrogen ion for reaction with the metal; suitable mixtures include glacial acetic acid and acetic anhydride; propionic acid and propionic anhydride; and the like. It has been found best to conduct the reaction under substantially anhydrous conditions since any water present naturally reacts with the anhydride and destroys the efficiency of the acylating agent. At the end of the reaction, any excess metal reducing agent is removed by filtration and washed with the organic acid used in the reaction, and the combined filtrates are evaporated to dryness under reduced pressure.

The residue is then treated with water and warmed to destroy any excess organic acid anhydride, and any organic acid present is then neutralized by means of a weak alkali such as sodium bicarbonate, and the like, preferably at a temperature below about 10° C. N-acylated arylamines produced in the reaction are usually sparingly soluble in water and can be crystallized substantially quantitatively by cooling this aqueous solution, and the crystalline product filtered therefrom. N-acylated alkyl amino compounds are more soluble and are contained in the aqueous filtrate from which they can be recovered by evaporation or extraction with a water immiscible solvent such as chloroform, ethylene dichloride, carbon disulfide and the like; it is presently preferred to use chloroform in this process. The product obtained upon evaporation of the extract is generally sufficiently pure for using directly in the preparation of amino acids, but it can be purified further if desired by crystallization from an organic solvent, such as ethanol.

The following examples illustrate methods of carrying out the present invention, but it is to be understood that these examples are given by way of illustration and not of limitation.

*Example 1*

About 25 g. of ethyl α-(phenyl-azo)-β-keto-butyrate (M. P. 80–82° C.), which can be prepared as described in Beil. XV 360, is dissolved in about 25 cc. of glacial acetic acid and the solution is added dropwise with good cooling to a well stirred mixture containing about 42 g. of zinc dust, about 55 cc. of glacial acetic acid and about 28 cc. of acetic anhydride. The rate of addition is adjusted so that the time required is approximately 70 minutes and the temperature is maintained at about 10–15° C. throughout the addition. The reaction mixture is stirred for approximately 4 hours additional time during which time the temperature is allowed to rise to about 28° C. and the reaction mixture is filtered and the insoluble material washed four times with 10 cc. portions of glacial acetic acid. The combined filtrate and washings are evaporated under reduced pressure to a final temperature of approximately 60° C. to produce an oil which upon adding about 50 cc. of water gives a crystalline slurry. The crystalline material which weighs approximately 10 g. is filtered and washed with about 25 cc. of water and dried to produce substantially pure acetanilide (M. P. 112–114° C.). Upon cooling an additional quantity of approximately 1.2 g. of acetanilide crystallizes from the filtrate and can be recovered. The filtrate is then neutralized with sodium bicarbonate to a pH of about 7 to 8 and the neutralized solution extracted repeatedly with chloroform. The chloroform extract is then dried over sodium sulfate and evaporated to dryness to produce crude ethyl α-acetamido-β-keto-butyrate (M. P. 40–45° C.) in over 90% of the theoretical yield, based on the ethyl α-(phenyl-azo)-β-keto-butyrate.

*Example 2*

About 41 g. of 3-(phenyl-azo)-2:4-diketo-pentane, which can be prepared as described in Beil XV, 179, is added portionwise with stirring over approximately a 1½ hour period and at a temperature of about 10–20° C. to a mixture containing about 110 cc. glacial acetic acid, about 55 cc. of acetic anhydride and about 84 g. of zinc dust. In order to complete the reduction, it is necessary to add about 35 g. additional zinc dust and preferably about 5 cc. acetic anhydride and about 15 cc. glacial acetic acid. After the addition, the reaction is stirred for approximately 2 hours additional time at the same time allowing the temperature to rise to about 24° C. and the reaction mixture is filtered and the insoluble material washed four times with about 15 cc. of glacial acetic acid. The filtrate is then evaporated to dryness under reduced pressure to produce a brown oil which is diluted with approximately 120 cc. water, whereupon acetanilide crystallizes out immediately; the resulting slurry is cooled to about 0° C. for approximately 1 hour and the crystalline product filtered and washed thoroughly with cold water and dried to produce about 24 g. of substantially pure acetanilide (M. P. 114–115° C.).

The filtrate is then evaporated to about 100 cc. total volume and cooled, whereupon a crystalline product forms and is recovered by filtration to produce about 11 g. of crude 3-acetamido-2:4-diketo-pentane (M. P. 85–96° C.). The residual material in the filtrate can be recovered by extracting repeatedly with chloroform, drying the chloroform extract over sodium sulfate and evaporating the chloroform solution to constant weight to produce about 18 g. of material melting at about 90–97° C.; yield over 90% of theoretical based on acetyl acetone starting material. This product can be purified by recrystallization from ethyl acetate and then isopropyl ether to produce substantially pure α-acetamido-α-acetyl acetone (105–106° C.).

The product gives a strong red color with ferric chloride. It is quite soluble in water, alcohol and chloroform; less soluble in ethyl acetate, benzene and ether.

*Example 3*

Ethyl α-(phenyl-azo)-α-cyano-acetate is prepared according to the process described in J. prakt. Chem. 49, 323 (1894) and J. prakt. Chem. 67, 396 (1903). About 43 g. of this azo compound which is a mixture of two isomeric forms as referred to above is added portionwise with good agitation over a period of approximately 1 hr. and at a temperature of approximately 10–15° C., to a mixture containing about 84 g. of zinc dust, about 110 cc. glacial acetic acid and about 55 cc. of acetic anhydride. During the addition, the color disappears rapidly and toward the end of the addition, the slurry becomes quite thick. About 60 cc. acetic acid is then added and the reaction is allowed to stir at a temperature of approximately 15–25° C. for 2 hours additional time. The reaction mixture is filtered and the insoluble material washed 4 times with approximately 15 cc. portions of glacial acetic acid. The acetic acid filtrate is cooled and allowed to stand for about 15 hours, whereupon a crystalline product separates and is recovered by filtration and dried to produce about 19 g. of crude material, which can be recrystallized from water to yield substantially pure ethyl α-acetamido-α-cyano-acetate; M. P. 129–130° C.

*Example 4*

About 18 g. of azo benzene is dissolved in about 75 cc. of glacial acetic acid and the solution is added dropwise with agitation over approximately a 1 hour period and at a temperature of about 25–30° C., to a mixture containing about 50 g. of zinc dust, about 55 cc. glacial acetic acid and about 30 cc. acetic anhydride. The reaction mixture is stirred without cooling for approximately 2½ hours additional time and about 5 g. more zinc dust is added after the first hour. The reaction mixture is then heated to approximately 90° C. for about ½ hour, cooled to room temperature and filtered and the insoluble material is washed with glacial acetic acid. The filtrate is then evaporated substantially to dryness under reduced pressure and the residual material mixed with about 50 cc. of water and the resulting precipitate ground to a fine slurry and cooled to about 5° C. for several hours. The insoluble material is filtered, washed with ice water and dried at about 70° C. to produce about 23 g. of crude material which is purified by recrystallization from water to yield substantially pure acetanilide; M. P. 111–113° C.

Modifications may be made in carrying out the present invention without departing from the spirit and scope thereof and the invention is to be limited only by the appended claims.

We claim:

1. The process of preparing compounds wherein one hydrogen of an active methylene grouping is replaced by an acetamido substituent which comprises reacting together zinc, acetic acid, acetic anhydride and a compound selected from the group of compounds having the formula: RCOCH(Y)—N=N—R' and

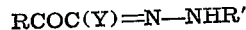

RCOC(Y)=N—NHR' wherein R is a lower alkyl radical, R' is aryl, and Y is an activating radical selected from the class which consists of cyano and carboalkoxy radicals, said reaction being carried out by bringing the reactants together under substantially anhydrous conditions, to produce a compound of the formula: RCOCH(Y)—NHCOCH₃ wherein R and Y have the significance above defined.

2. The process of preparing alkyl α-acetamido-β-keto-butyrates which comprises reacting together an alkyl α-arylazo-β-keto-butyrate, zinc, acetic acid and acetic anhydride, said reaction being carried out by bringing the reactants together under substantially anhydrous conditions.

3. The process of preparing ethyl α-acetamido-β-keto-butyrate which comprises reacting together ethyl α-phenyl-azo-β-keto-butyrate, zinc dust, acetic acid and acetic anhydride, said reaction being carried out by bringing the reactants together under substantially anhydrous conditions.

KARL PFISTER, III.
MAX TISHLER.

REFERENCES CITED

The following references are of record in the file of this patent:

UNITED STATES PATENTS

| Number | Name | Date |
|---|---|---|
| 902,150 | Heidenreich | Oct. 27, 1908 |
| 1,900,442 | Grether | Mar. 7, 1933 |
| 2,357,912 | Seymour et al. | Sept. 12, 1944 |
| 2,393,723 | Tullar | Jan. 29, 1946 |

OTHER REFERENCES

Bulow et al., Ber. Deut. Chem., vol. 35, pp. 919–937 (1902).

Bulow et al., Ber. Deut. Chem., vol. 43, pp. 234–242 (1910).

Fischer et al., Liebig's Ann., vol. 383, pages 363–371 (1911).

Degering, "Outline of Org. Nitrogen Compounds" (Univ. Lithoprinters, 1945), pages 204, 229.